United States Patent [19]

Hale

[11] Patent Number: 4,824,459
[45] Date of Patent: Apr. 25, 1989

[54] MARKER PIN FOR A UNIVERSAL STEM MOLD

[75] Inventor: John R. Hale, Lancaster, Pa.
[73] Assignee: Thomson Consumer Electronics, Inc., Indianapolis, Ind.
[21] Appl. No.: 196,593
[22] Filed: May 20, 1988
[51] Int. Cl.$^4$ .......................................... C03B 23/217
[52] U.S. Cl. ................... 65/59.26; 65/59.31; 65/59.32; 65/59.7; 65/139; 65/155; 65/173
[58] Field of Search .............. 65/59.25, 59.26, 59.27, 65/59.31, 59.32, 59.7, 138, 139, 155, 173

[56] References Cited

U.S. PATENT DOCUMENTS

| | | | |
|---|---|---|---|
| 2,030,185 | 2/1936 | Rose, Jr. | 65/59.27 X |
| 2,107,254 | 2/1938 | Horn | 65/59.27 X |
| 2,284,151 | 5/1942 | Kingston | 250/27.5 |
| 2,313,025 | 3/1943 | Scharfnagel | 65/138 |
| 2,338,507 | 1/1944 | Haas et al. | 250/27.5 |
| 2,340,879 | 2/1944 | Horn | 49/81 |
| 2,781,613 | 2/1957 | Watkins | 65/139 |
| 3,201,216 | 8/1965 | Handmann | 65/138 |
| 4,767,436 | 8/1988 | Hale | 65/139 |

Primary Examiner—Arthur Kellogg
Attorney, Agent, or Firm—Eugene M. Whitacre; Dennis H. Irlbeck; Vincent J. Coughlin, Jr.

[57] ABSTRACT

An apparatus for manufacturing a glass stem for an electron tube comprises a first mold assembly and a second mold assembly for forming the stem therebetween. The glass stem includes a plurality of fillets with a lead-in conductor through less than all of the fillets and at least one dummy fillet without a lead-in conductor therethrough. The first mold assembly includes a universal stem having a mold block with fillet-forming openings therein. A replaceable marker pin is disposed and retained within the openings. The marker pin has a first end and an oppositely disposed second end. The first end has a distinctive geometric shape for contacting the dummy fillet and for conveying intelligible information thereto.

11 Claims, 4 Drawing Sheets

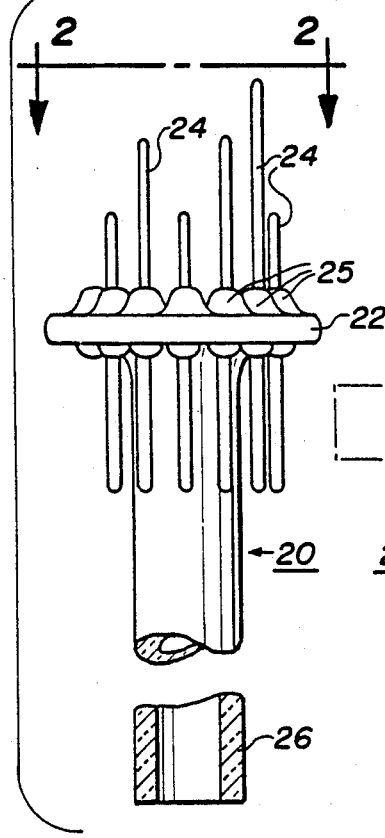
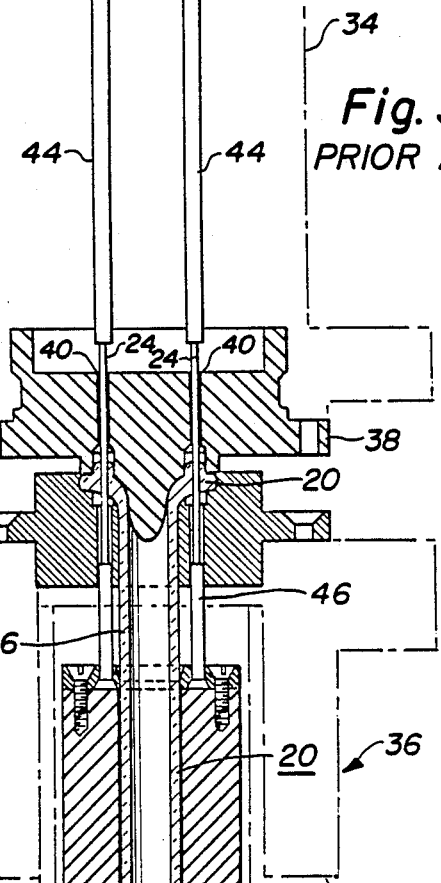
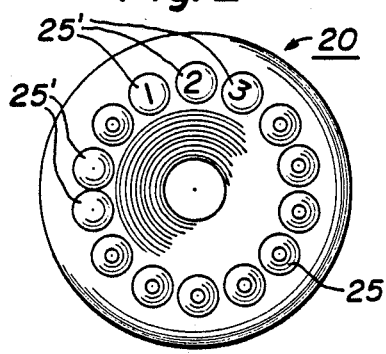
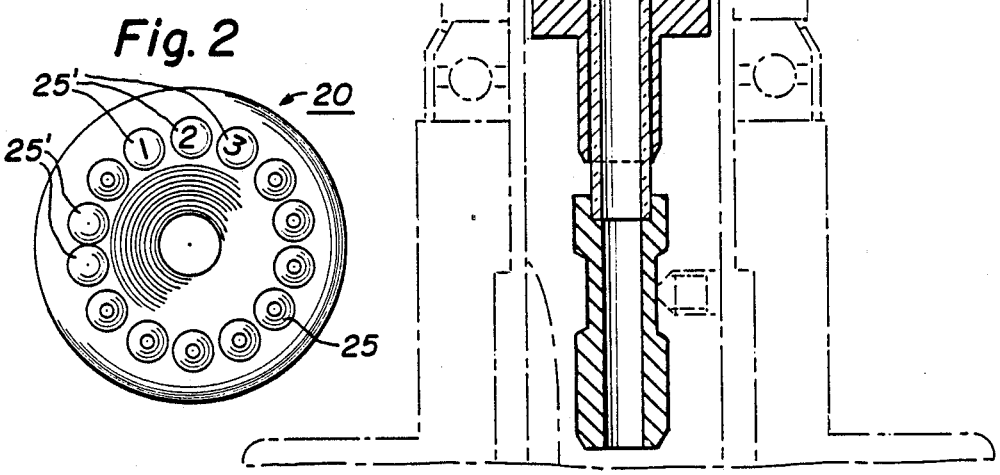

MARKER PIN FOR A UNIVERSAL STEM MOLD

BACKGROUND OF THE INVENTION

The invention relates to a glass stem making apparatus, and more particularly to a universal stem mold having one or more replaceable marker inserts disposed within a mold block for imprinting information into the glass of the stem.

The glass stem comprises a number of lead-in conductors (or leads) usually ranging from five to twelve for use with a cathode-ray tube, CRT. Each of the leads extends through a glass disk in a direction perpendicular to the plane of the disk forming a circular array of leads. Typically, the leads comprise three component parts: an outer lead, an inner lead and a central press lead. The leads are round, copper sheathed, 42 percent nickel-iron wire, coated with fused sodium tetraborate. This lead material is commonly known as dumet. Alternatively, a one-piece lead of 52 alloy (52% nickel, balance iron) may be used. A glass fillet surrounds the junction of the outer, press, and inner leads to provide structural strength. Typically, there is at least one and preferably two or more dummy fillets, i.e., fillets without leads therethrough. These dummy fillets serve to provide electrical isolation between a high voltage lead and the next adjacent stem leads.

U.S. Pat. No. 3,201,216 issued to Handmann on Aug. 17, 1965 describes an apparatus or stem machine for producing an electronic tube stem. The apparatus comprises upper and lower portions of a stem mold assembly. Such a stem is usually made by inserting the leads in holes in a rotatable lower portion of the stem mold assembly which is mounted on an indexable turret. A glass cylinder is placed on the lower stem mold assembly around or within the leads (or both) and the leads and then the glass cylinder are heated to melt the glass. The glass cylinder is pressed into a disk in which of the leads are embedded. Each of these operations takes place at an indexed position of the turret. During the heating operation, the leads, the glass cylinder, and the lower portion of the stem mold assembly are rotated to uniformly heat the glass. During the pressing step, the upper portion of the stem mold assembly is pressed down onto the glass cylinder. Usually, the upper mold assembly is either rotated in synchronism with, and in properly indexed relation to, the lower mold assembly, or the lower mold assembly is stopped in a properly indexed position relative to a stationary upper mold assembly. When the upper mold assembly is lowered to the pressing position, the leads extend into lead receiving holes in the upper mold assembly. As is known in the art, a tubulation is usually centrally disposed within the disk to permit evacuation and seal-off of the CRT. While most rotary stem machines have 24 or 30 lower stem mold assembly positions, there usually are only tow, three or four upper mold assembly positions on a stem machine, the actual number reflects the preference of the machine designer. Where there are a plurality of pressing positions., reheating of the stem occurs between each pressing position (or station). The upper mold assemblies differ slightly from station-to-station and can be thought of, for convenience, as progressing from a rough press to a finished press.

In the manufacturing of glass stems for electron tubes such as, CRT's, it is desirable to be able to identify the stem machine on which the stems are made and also the date of manufacture to facilitate the evaluation of stem quality. It is known in the prior art to provide this information by reverse engraving the bottom of one or more screws which are threaded into the side of the stem mold. However, the threads of the screws and the threads formed in the mold deteriorate in a short time and necessitate the replacement of the mold. Accordingly, it is desirable to provide stem identification means on at least the last pressing station of each stem machine without shortening the life of the stem mold.

SUMMARY OF THE INVENTION

An apparatus for manufacturing a glass stem for an electron tube comprises a first mold assembly and a second mold assembly for forming the stem therebetween. The glass stem includes a plurality of fillets with a lead-in conductor through less than all of the fillets. The first mold assembly comprises a universal stem mold having a mold block with fillet-forming openings therein. At least one replaceable marker pin is disposed and retained within the fillet forming openings in the mold block. The marker pin has a first end and an oppositely disposed second end. The first end has a distinctive geometric shape for contacting one of the fillets without a lead-in conductor therethrough and for conveying intelligible information thereto.

BRIEF DESCRIPTION OF THE DRAWINGS

FIG. 1 is a partially cut-away longitudinal view of a stem made according to the present invention.

FIG. 2 is a top view taken along line 2—2 of FIG. 1.

FIG. 3 is a cut-away sectional view of a portion of a conventional stem manufacturing apparatus showing a first and second stem mold assembly.

DETAILED DESCRIPTION OF THE PREFERRED EMBODIMENTS

Figure 4:
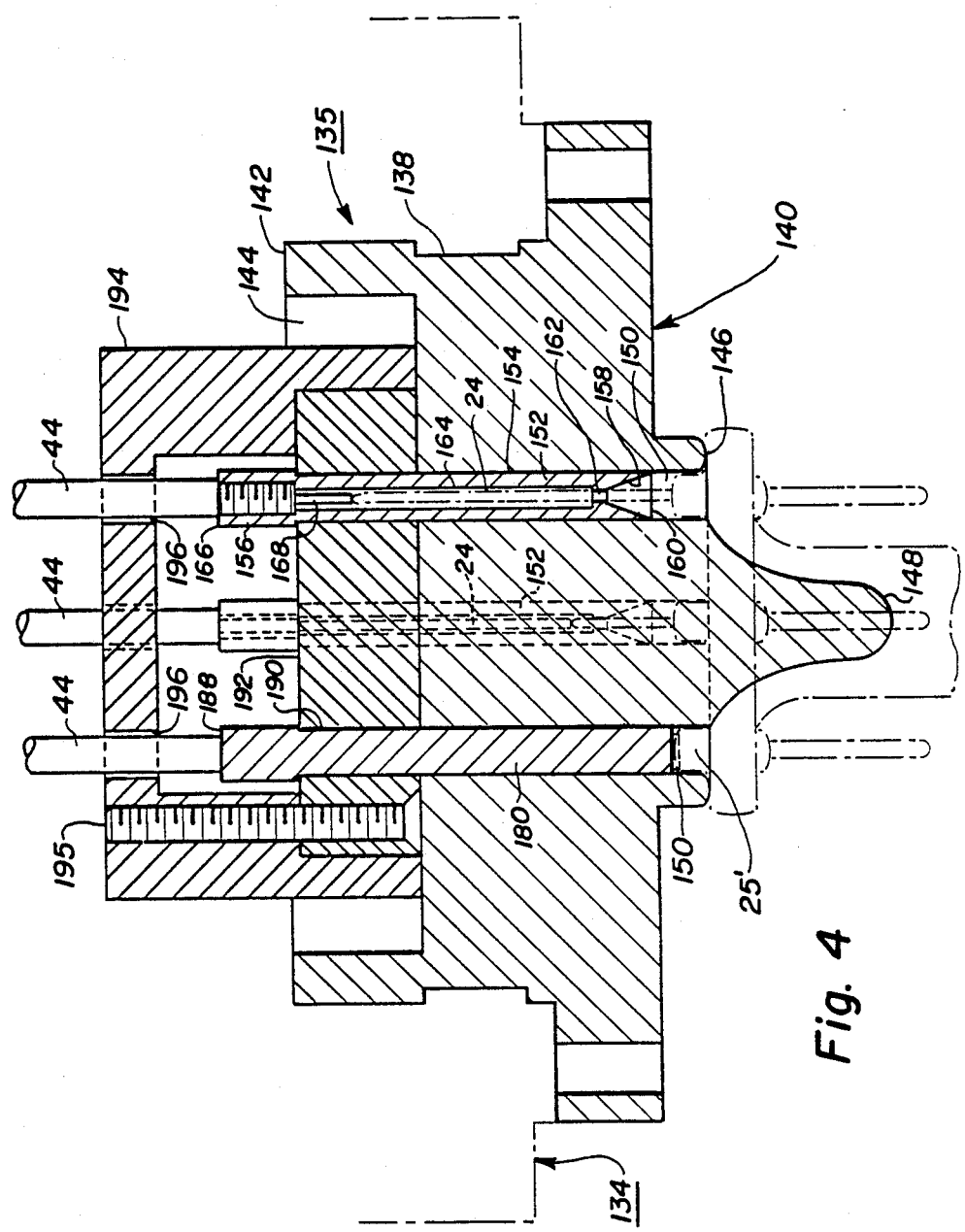
FIG. 4 is a partially cut-away sectional view of a first embodiment of a first mold assembly according to the present invention.

FIGS. 1 and 2 show a stem 20 made according to the present invention. The stem 20 is used in an electron tube (not shown) such as a CRT. The stem 20 includes a glass disk 22 having a plurality of lead-in conductors, or leads, 24 extending through a plurality of fillets 25. One or more dummy fillets, 25', i.e., fillets without leads therethrough, are provided on the disk on either side of a lead which carries a voltage of several kilovolts in order to provide greater electrical isolation by physically increasing the distance from the high voltage lead to the adjacent leads. A tubulation 26 is integral with the glass disk 22 and provides a means for evacuating and sealing the evacuated CRT. Each of the leads 24 may be of the same inner length, or the lengths may be different.

A conventional stem making apparatus 21 is shown in FIG. 3. The apparatus 21 comprises a first (or upper) stem mold assembly 34 (only a portion of which is shown) and a second (or lower) stem mold assembly 36 (only a portion of which is shown). The upper stem mold assembly 34 includes a mold block 38 having a plurality of apertures 40 extending longitudinally through the body thereof to accommodate the inner portions of the leads 24 of the stem 20. A plurality of lead-weights 44 contact the inner ends of the leads 24 with sufficient weight to urge the outer ends of the leads against supports 46 in the lower stem mold assembly 36. As described herein, the prior art stem making apparatus 21 has no provision for identifying the stems made thereon. Any permanently engraved indicator would identify the mold or stem machine; however, changeable indicators are necessary for information such as the day of manufacture and other variables.

FIG. 4 shows a first preferred embodiment of a portion of an upper stem mold assembly 134 comprising a plurality of conventional lead-weights 44 and a universal stem mold 135 of the type described in my copending patent application filed concurrently herewith and entitled, UNIVERSAL STEM MOLD FOR MANUFACTURING A MOLDED GLASS STEM, which is assigned to the assignee of the present invention. The stem mold 135 includes a mold block 138 with a first surface 140 and an oppositely disposed second surface 142. A cavity 144 is formed in the second surface of the mold block 138. The first surface 140 includes a stem press, or glass-contacting, portion 146 having a centrally disposed projection 148 extending away from the stem press portion. A plurality fillet-forming openings 150, having a constant diameter of 2.91 mm (0.1145 inch) are drilled on a 15.44 mm (0.608 inch) diameter pin circle through the mold block 138 from the glass contacting portion 146 of the first surface 140 to the cavity 144 in the second surface 142. Preferably fourteen holes are drilled to produce any type of stem commonly used for electron tubes. Preferably, the stem mold 135 is formed of 440C or 416 stainless steel which is easy to machine.

A plurality of fillet-forming inserts 152 which act as lead retaining means are provided for use in combination with the mold block 138. Each of the inserts 152 includes a main body comprised of a shank portion 154 having a first diameter of 2.87 mm (0.113 inch) and a shoulder portion 156 having a second diameter of 3.175 mm (0.125 inch). A recess 158? is formed in a first end 160 of the insert 152 and a lead-accommodating opening 162 is formed through at least a portion of the shank of the insert 152 from the recess 158. A channel 164 is formed in the insert 152 and extends from the oppositely disposed second end 166 to the opening 162. The recess 158 has a truncated conical shape with the flared portion of the recess opening into the first end 160. The recess 158 subtends a half-angle of 20 degrees. The narrow end of the recess 158 terminates in the lead-accommodating opening 162 which has a diameter of about 0.79 mm (0.0312 inch). The channel 164 has a diameter of about 1.17 mm (0.046 inch). The length of the channel 164 is typically about 22.43 mm (0.883 inch) long. The portion of the channel 164 adjacent to the second end 166 is tapped to accommodate a lead stop 168. Preferable, the inserts 152 are formed from 446 stainless steel which is resistant to the formation of oxidation and scale at glass molding temperatures. The lead stop 168 is disposed within the channel 164 to act as a contact surface or stop for the inner portions of the leads 24 of the stem 20. The length of the lead stop 168 is selected to accommodate inner leads of different lengths. The lead stop 168 is threaded into the second end 166 of the insert 152.

Figure 5A:
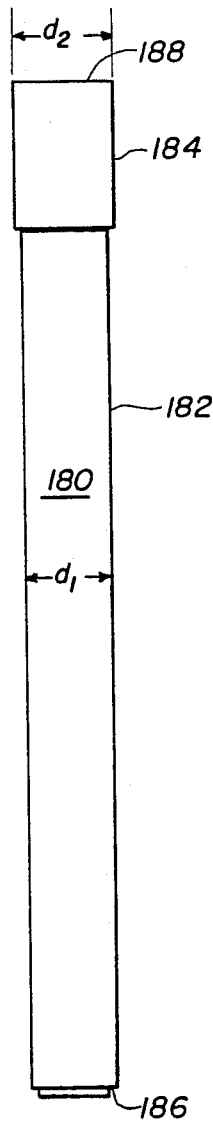
FIGS. 5 and 5A are side and end views, respectively, of a marker pin according to the present invention.
Figure 5B:
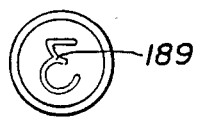

At least one novel marker pin 180 is disposed within one of the fillet-forming opening 150 in the mold block 138. The marker pin 180, shown in FIGS. 5 and 5A is preferably formed from 446 stainless steel and includes a shank portion 182 having a length of about 28.65 mm (1.128 inch), a first diameter, $d_1$, of 2.79 mm (0.110 inch), and a shoulder portion 184 having a length of about 4.67 mm (0.184 inch) and a second diameter, $d_2$, of 3.175 mm (0.125 inch). The marker pin 180 has a first end 186 and an oppositely disposed second end 188. The first end 186 has a distinctive geometric shape 189 integral therewith. The shape is preferably that of at least one reversed alpha-numeric character which contacts the dummy fillet 25' and conveys intelligible information thereto. The characters may be either raised from or engraved into the first end 186 of the marker pin 180. While alpha-numeric characters are preferred, the invention encompasses any geometric or symbolic character which can impart intelligible information.

As shown in FIG. 2, a nine lead stem 20 includes five dummy fillets 25' which are available for informational purposes. In FIG. 2, three of the dummy fillets are used, e.g., to convey the day of the year (e.g., the 123rd day). The remaining dummy fillets may be used to identify the stem machine, the year, or any other variable manufacturing information deemed necessary to maintain quality.

Again with reference to FIG. 4, in order to make a stem 20 with information conveyed on the tops of the dummy fillets 25', the fillet-forming openings 150 of the stem mold 135 are fitted with at least one replaceable marker pin 180 and a plurality replaceable inserts 152. First, the inserts 152 and the marker pins 180 are placed within the pin apertures 190, formed in a pin holder 192. The pin holder 192 is then attached to a translator 194 by means of screws 195 (only one of which is shown). The resultant subassembly comprising the pin holder 192, the translator 194, the inserts 152 and the marker pins 180 is then disposed within the cavity 144 in the second surface of the mold block 138 so that the inserts 152 and marker pins 180 are located within the openings 150 in the mold block 138. About 0.04 mm to 0.07 mm of clearance is provided between the wall surrounding the openings 150 and the inserts 152 and the maker pins 180 to facilitate replacement thereof when required. The marker pins 180 are of sufficient length to contact and to have the geometric shape 189 penetrate the tops of the molten dummy fillets 25' at the final pressing station (not shown).

The lead-weights 44 extend through lead-weight apertures 196 in the translator 194 and contact the second ends 166 and 188 of the inserts 152 and the marker pins 180, respectively, to retain these elements within the opening 150 in the mold block 138.

Figure 6:
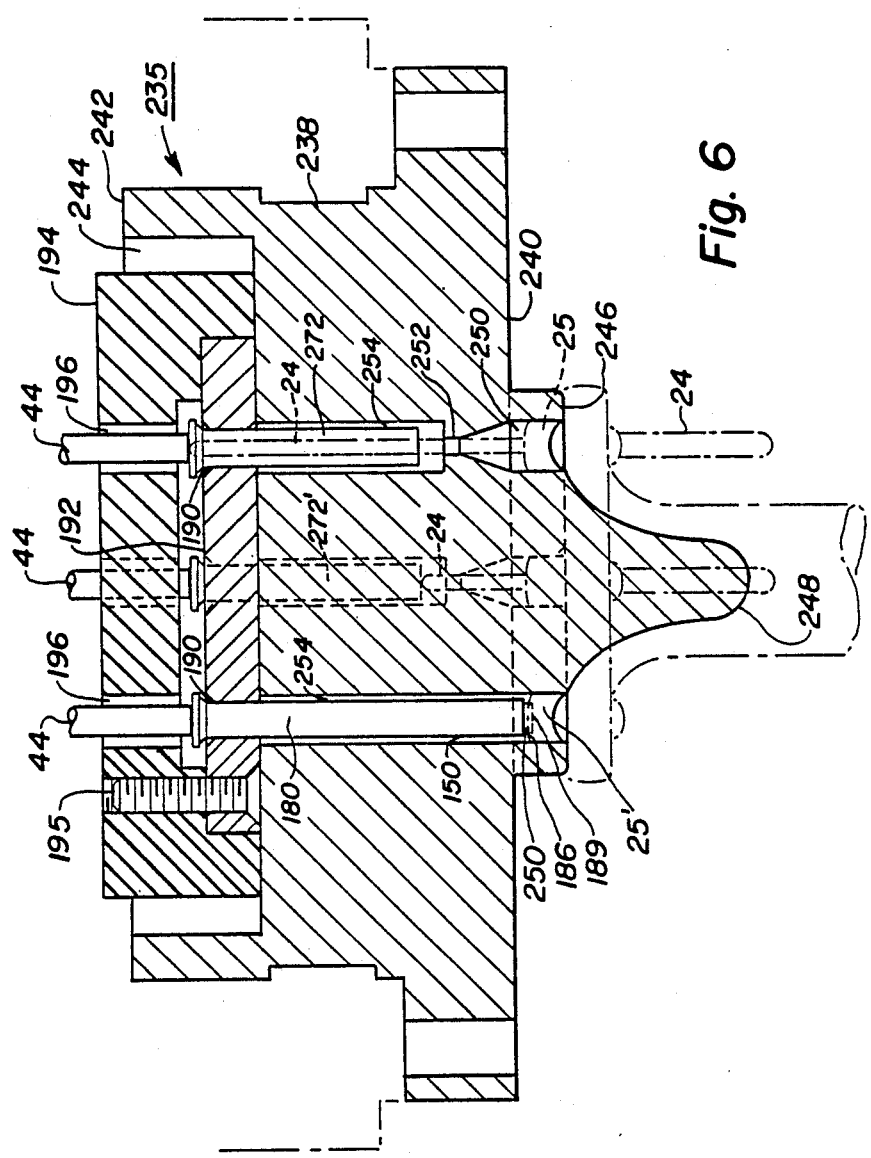
FIG. 6 is a partially cut-away sectional view of a second embodiment of a first mold assembly according to the present invention.

FIG. 6 shows another embodiment of the present invention wherein identical structures or elements are designated by the same reference numbers. A modified universal stem mold 235 comprises a plurality of conventional lead-weights 44 and a modified mold block 238. The mold block 238 has a first surface 240 and an oppositely disposed second surface 242. A cavity 244 is formed in the second surface 242. The first surface 240 includes a stem press portion 246 having a centrally disposed projection 248 extending away from the stem press portion. A plurality of first fillet recesses 250 circumscribe the projection 248 and each fillet recess communicates through a guide opening 252 with a buffer-pin-well 254, which opens into the cavity 244 in the second surface 242. The lead-weight translator 194 is disposed within the cavity 244. The plurality of lead-weight apertures 196 extend through the translator 194.

The pin holder 192 is secured to the translator 194 by, for example, the screws 195 (only one of which is shown). The pin apertures 190 of the pin holder 192 are aligned with the buffer-pin-wells 254 in the mold block 238 and also with the lead-weight apertures 196 in the translator 194. A plurality lead-in-conductor-buffer-pins 272 (only one of which is shown) are disposed within the pin apertures 190 and extend into the pin wells 254. The buffer pins 272 accommodate the inner portion of the leads 24 within a longitudinal bore of appropriate length. For the shortest leads 24, one or more solid buffer pins 272' act as stops to restrict the height thereof. The novel mold block 238 differs from the structure described in my U.S. patent application Ser. No. 114,356, in that the present mold block 238 includes one or more second fillet-forming recesses or openings 150 lying on the pin circle of the fillet recesses 250. The openings 150 extend through the mold block 238 from the stem press portion 246 into the recess 244. A marker pin 180 with the the geometric shape 199 formed in the first end 186 thereof is disposed within each of the opening 150 and contacts the tops of the molten dummy fillets 25' to convey intelligible information thereto. Dummy fillets without intelligible information thereon are formed by using smooth faced, solid, inserts (not shown), i.e., inserts without either lead-accommodating openings (or bores) and without the distinctive geometric shape formed in the first end thereof. The lead weights 44 retain the buffer pins 272, 272' and the marker pins 180 within the mold block 238.

Fabrication of the stem 20, having intelligible information conveyed to the top of one or more of the dummy fillets 25', is similar to fabrication of a prior art stem. With reference to FIGS. 1 through 4, a plurality of leads 24 are loaded into the lower stem mold assembly 36 so that one end of each lead contact the support 46. The upper mold assembly 134, in spaced apart relation to the lower stem mold assembly 36, includes the stem mold 135 (FIG. 4) having inserts 152 and marker pins 180 disposed within the fillet forming openings 150. A mass of glass (not shown) is positioned around and/or within the leads 24 on the lower stem mold assembly 36 and a tubulation 26 is disposed within the glass mass. The low stem mold assembly 36, glass and leads 24 are heated e.g., with a gas flame (not shown), to a temperature sufficient to melt the glass and a portion of the tubulation. The upper mold assembly 134 is repositioned relative to the lower mold assembly 36 so that the inner portions of the leads 24 extend into the inserts 152. The lead-weights 44 (of substantially equal length) contact the ends 166 and 188 of the inserts 152 and the marker pins 180, respectively, to exert a downward force sufficient to retain the marker pins 180 within the opening 150 and to maintain the other end of the leads 24 in contact with the support 46 in the lower stem mold assembly. The upper and lower mold assemblies 134 and 36, respectively, are brought together to press the melted glass and fuse the glass into a disk 22 with fillets 25 surrounding the leads 24 and dummy fillets 25' being formed in the opening 150 containing the marker pins 180. The symbol 189 on each marker pin is conveyed onto the top of the dummy fillets 25'. At the completion of the molding step, the upper mold assembly 134 is raised and the stem 20 is removed from the lower stem mold assembly 36.

What is claimed is:

1. In an apparatus for manufacturing a glass stem for an electron tube having a plurality of lead-in conductors and a greater plurality of fillets, said lead-in conductors extending through said fillets, there being at least one dummy fillet without a lead-in conductor extending therethrough, said apparatus comprising a first mold assembly and a second mold assembly for forming said stem therebetween, said first mold assembly including fillet forming means therein, the improvement wherein said first stem mold assembly comprises
   a universal stem mold having a plurality of fillet-forming openings formed through a mold block; and at least one marker pin replaceably disposed and retained within said fillet-forming openings, said marker pin having a first end and an oppositely disposed second end spaced therefrom, said first end having a distinctive geometric shape for contacting said dummy fillet and for conveying intelligible information thereto.

2. The stem mold defined in claim 1 wherein said geometric shape is at least one alpha-numeric character.

3. The stem mold defined in claim 2 wherein said geometric shape is integral with said first end of said marker pin.

4. The stem mold defined in claim 3 wherein said geometric shape is a raised, reversed character.

5. The stem mold defined in claim 3 wherein said geometric shape is an engraved, reversed character.

6. In an apparatus for manufacturing a glass stem for an electron tube having a plurality of lead-in conductors and a greater plurality of fillets, said lead-in conductors extending through said fillets, there being at least one dummy fillet without a lead-in conductor extending therethrough, said stem mold comprising a first mold assembly and a second mold assembly for forming said stem therebetween, said first mold assembly including a plurality of lead-weights and a mold block having a first surface and an oppositely disposed second surface with a cavity formed in said second surface of said mold block, said first surface having a plurality of first fillet recesses therein
   each of said first fillet recesses in said mold block communicating with a buffer-pin-well opening into said cavity,
   a lead-weight translator disposed within said cavity, said translator having a plurality of lead-weight apertures extending therethrough,
   a plurality of lead-in-conductor-buffer-pins disposed within said pin apertures and extending into said pin wells in said mold block, said buffer pins providing means for accommodating said lead-in conductors, said buffer pins being in contact with said lead-weights extending through said lead-weight apertures in said translator, wherein the improvement comprises:
   at least one second fillet recess in said mold block, said second fillet recess extending from said first surface to said second surface of said mold block, and
   a replaceable marker pin disposed within said second fillet recess and extending through a pin aperture in said pin holder, said marker pin having a first end and an oppositely disposed second end spaced therefrom, said first end having a distinctive geometric shape for contacting said dummy fillet and for conveying intelligible information thereto, said second end of said marker pin being in contact with one of said lead-weights for retaining said marker pin within said second fillet recess of said mold block.

7. The stem mold defined in claim 6 wherein said geometric shape is at least one alpha-numeric character.

8. The stem mold defined in claim 7 wherein said geometric shape is integral with said first end of said marker pin.

9. The stem mold defined in claim 8 wherein said geometric shape is a raised, reversed character.

10. The stem mold defined in claim 9 wherein said geometric shape is an engraved, reversed character.

11. A method for manufacturing a molded glass stem for an electron tube, said stem having a plurality of lead-in conductors extending therethrough, said method comprising the steps of:

(a) providing a stem mold having a first mold assembly and a second mold assembly, at least one of the stem mold assemblies being moveable relative to the other stem mold assembly, said first mold assembly including a mold block, a lead-weight translator, a pin holder, a plurality of inserts and at least one marker pin having a geometric shape at one end thereof, said inserts and said marker pin being disposed within said mold block;

(b) positioning said first mold assembly and said second mold assembly in spaced-apart relation;

(c) disposing said plurality of lead-in conductors within said second mold assembly so that one end of each of said lead-in conductors is in contact with a support platform assembly;

(d) locating a mass of glass on said second mold assembly around said lead-in conductors;

(e) heating said mass of glass, said lead-in conductors and said second mold assembly to a temperature sufficient to melt said glass;

(f) repositioning said first mold assembly and said second mold assembly so that the other end of each of said lead-in conductors extends through said inserts in said mold block, there being at least one opening in said mold block without a lead-in conductor, said opening having a marker pin therein;

(g) contacting each of said inserts and said marker pin with a different one of a plurality of lead-weights extending through a plurality of lead-weight apertures in said translator of said first mold assembly to maintain said one end of said lead-in conductors in contact with said support platform of second mold assembly and to retain said marker pin within said mold block; and (h) pressing said mass of melted glass between the first and second mold assemblies to fuse said glass into a glass stem comprising a disk having fillets around said lead-in conductors of said stem and at least one dummy fillet that is contacted by the geometric shape at the end of said marker pin for conveying intelligible information to said dummy fillet.

* * * * *

UNITED STATES PATENT AND TRADEMARK OFFICE
CERTIFICATE OF CORRECTION

PATENT NO. : 4,824,459

DATED : April 25, 1989

INVENTOR(S) : John R. Hale

It is certified that error appears in the above-identified patent and that said Letters Patent is hereby corrected as shown below:

Col. 1, line 57, change "tow" to --two--.

Col. 3, line 41, change "1587" to --158--.

Col. 4, line 41, change "maker" to --marker--.

Col. 5, line 36, change "contact" to --contacts--.

Signed and Sealed this

Third Day of October, 1989

Attest:

DONALD J. QUIGG

Attesting Officer

Commissioner of Patents and Trademarks